US008609233B2

(12) United States Patent
Pietrantoni et al.

(10) Patent No.: US 8,609,233 B2
(45) **Date of Patent: *Dec. 17, 2013**

(54) INTERMEDIATE TRANSFER MEMBER

(75) Inventors: Dante M. Pietrantoni, Rochester, NY (US); Yuhua Tong, Webster, NY (US); Michael S. Roetker, Webster, NY (US); Francisco J. Lopez, Rochester, NY (US); Kyle B. Tallman, Farmington, NY (US); Jonathan H. Herko, Walworth, NY (US); Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 691 days.

This patent is subject to a terminal disclaimer.

(21) Appl. No.: 12/833,136

(22) Filed: Jul. 9, 2010

(65) Prior Publication Data

US 2012/0009371 A1 Jan. 12, 2012

(51) Int. Cl.

| | |
|---|---|
| ***B32B 27/32*** | (2006.01) |
| ***C08G 64/16*** | (2006.01) |
| ***C08L 71/12*** | (2006.01) |
| ***C08G 73/10*** | (2006.01) |

(52) U.S. Cl.

USPC ........... 428/220; 524/495; 524/496; 524/611; 524/612; 524/847

(58) Field of Classification Search

None

See application file for complete search history.

(56) References Cited

U.S. PATENT DOCUMENTS

| | | | | |
|---|---|---|---|---|
| 3,411,936 | A * | 11/1968 | Roteman et al. | 430/118.6 |
| 3,820,987 | A * | 6/1974 | Wells | 430/33 |
| 7,194,224 | B2 * | 3/2007 | Niimi et al. | 399/111 |
| 7,341,812 | B2 * | 3/2008 | Wu et al. | 430/63 |
| 8,138,300 | B1 * | 3/2012 | Qi et al. | 528/190 |
| 8,349,942 | B2 * | 1/2013 | Roetker et al. | 430/84 |
| 2010/0273100 | A1 * | 10/2010 | Yu et al. | 430/58.05 |
| 2011/0045305 | A1 * | 2/2011 | Gilmartin et al. | 428/423.1 |
| 2012/0010337 | A1 * | 1/2012 | Gilmartin et al. | 524/114 |
| 2012/0288788 | A1 * | 11/2012 | Roetker et al. | 430/84 |
| 2013/0004205 | A1 * | 1/2013 | Gilmartin et al. | 399/176 |

OTHER PUBLICATIONS

Bisphenol A: A Safety and Handling Guide (1997), p. 10: "Epoxy Resins".*

Haopeng et al. "Isocyanate-terminated Polyethers Toughened Epoxy Resin: Chemical Modification, Thermal Properties, Mechanical Strength," Journal of Wuhan University of Technology-Mater. Sci. Ed., Jun. 2007, vol. 22, Issue 2, pp. 256-260.*

* cited by examiner

*Primary Examiner* — David Sample
*Assistant Examiner* — Nicole T Gugliotta
(74) *Attorney, Agent, or Firm* — Hoffman Warnick LLC

(57) ABSTRACT

Described herein is an intermediate transfer member that includes a layer of phenoxy resin having dispersed therein conductive particles.

18 Claims, 2 Drawing Sheets

INTERMEDIATE TRANSFER MEMBER

BACKGROUND

1. Field of Use

This disclosure is directed to an image forming apparatus and an intermediate transfer member.

2. Background

Image forming apparatuses in which a color or black and white image is formed by using an intermediate transfer member to electrostatically transfer toner are well known. When an image is formed on a sheet of paper in a color image forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor and superimposed on an intermediate transfer member, and then transferred to a sheet of paper.

An intermediate transfer member is required in an image-forming apparatus.

SUMMARY

Described herein is an intermediate transfer member that includes a layer comprising phenoxy resin having dispersed therein conductive particles.

Disclosed is an intermediate transfer member that includes a surface layer comprising a phenoxy resin having dispersed therein conductive carbon black particles wherein the phenoxy resin has the structure

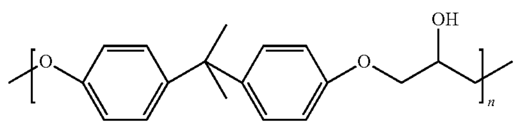

wherein n is from about 40 to about 400. The surface layer has a Young's Modulus of greater than 2000 MP and a flexural strength of greater than 2000 MPa.

Described herein is an intermediate transfer member that includes a surface layer comprising a phenoxy resin having dispersed therein conductive carbon black particles. The phenoxy resin has the structure:

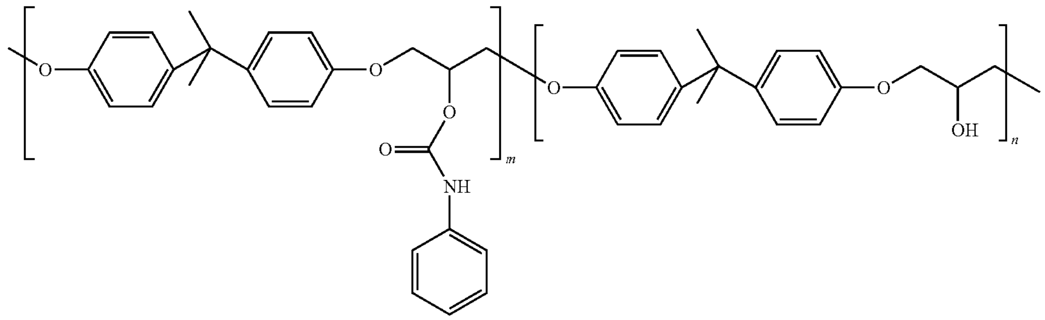

wherein m is from about 1 to about 399 and n is from about 399 to about 1. Using a polyisocyanate, such as toluene diisocyanate (TDI) to react with the phenoxy resin provides an isocyanate cross-linked phenoxy resin for the surface layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
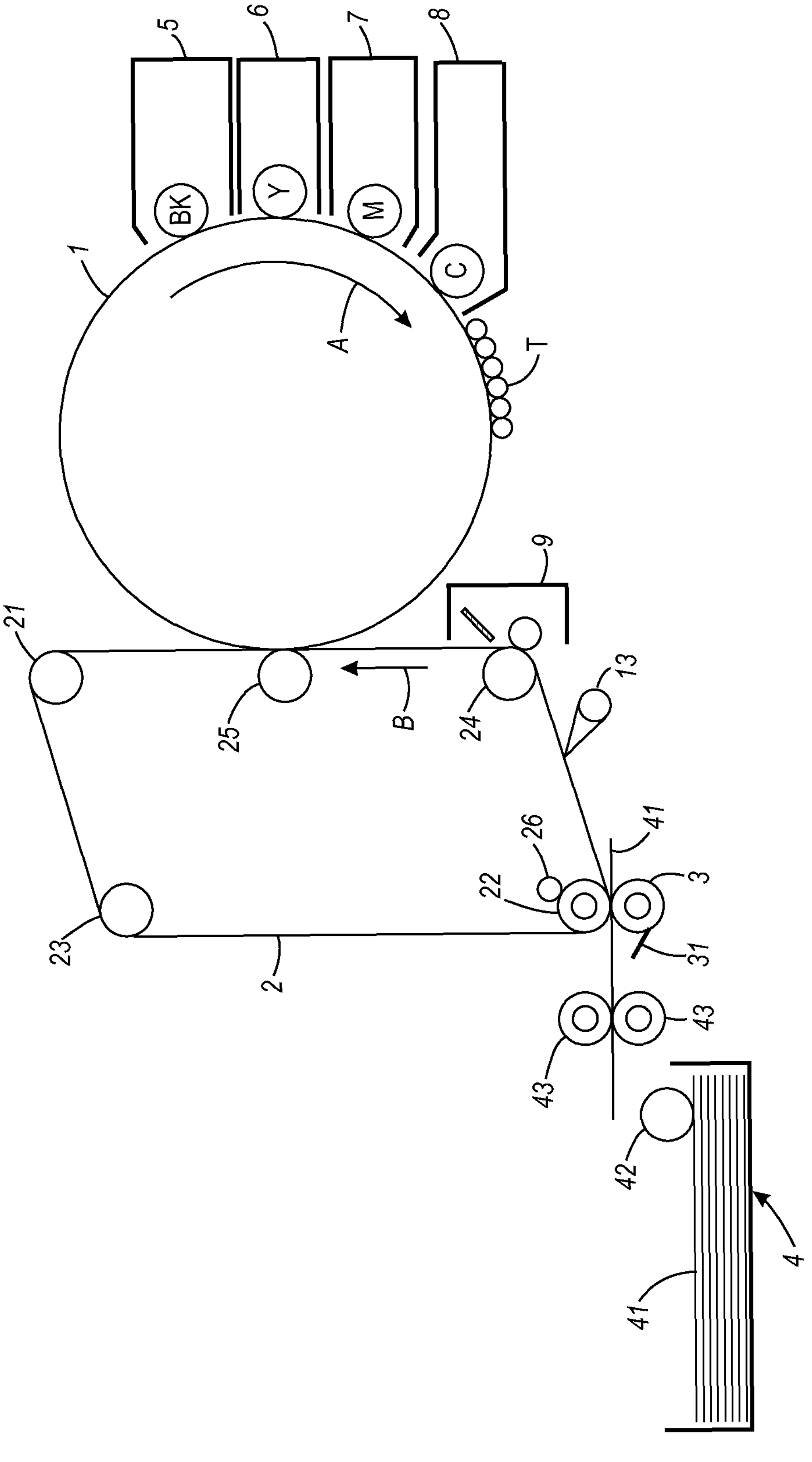
FIG. 1 is a schematic illustration of an image apparatus.

Referring to FIG. 1, an image forming apparatus includes an intermediate transfer member as described in more detail below. The image forming apparatus is an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also, in the image forming apparatus, the intermediate transfer member may be provided as a transfer-conveying member in the transfer region for transferring the toner image onto the transfer material. Having an intermediate transfer member that transfers images of high quality and remains stable for a long period is required.

The image forming apparatus described herein is not particularly limited as far as it is an image forming apparatus of intermediate transfer type, and examples include an ordinary monochromatic image forming apparatus accommodating only a monochromatic color in the developing device, a color image forming apparatus for repeating primary transfer of the toner image carried on the image carrier sequentially on the intermediate transfer member, and a tandem color image forming apparatus having plural image carriers with developing units of each color disposed in series on the intermediate transfer member. More specifically, the image forming apparatus may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and other known methods as required.

As the image carrier, a known one may be used. As the image carrier's photosensitive layer, an organic system, amorphous silicon, or other known material may be used. In the case of an image carrier of cylindrical type, the image carrier is obtained by a known method of molding aluminum or aluminum alloy by extrusion and processing the surface. A belt form image carrier may also be used.

The charging unit is not particularly limited and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent charge compensation capability. The charging unit usually applies DC current to the electrophotographic photosensitive material, but AC current may be further superimposed.

The exposure unit is not particularly limited, for example, an optical system device, which exposes a desired image on the surface of the electrophotographic photosensitive material by using a light source such as semiconductor laser beam, LED beam, liquid crystal shutter beam or the like, or through a polygonal mirror from such light source, may be used.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used.

The second transfer unit may be the same as the first transfer unit, such as a contact type transfer charger using transfer roller and others, scorotron transfer charger, and corotron transfer charger. By pressing firmly using the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be performed.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image forming apparatus for repeating primary transfer is shown schematically in FIG. 1. The image forming apparatus shown in FIG. 1 includes a photosensitive drum 1 as image carrier, an intermediate transfer member 2, shown as an intermediate transfer belt, a bias roller 3 as transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and feed rollers 43.

In the image forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the intermediate transfer member 2, and the primary transfer is executed by rotation of the intermediate transfer member 2 in the direction of arrow B.

Similarly, a toner image of a second color, a toner image of a third color, and a toner image of a fourth color are sequentially formed and overlaid on the transfer belt 2, and a multi-layer toner image is formed.

The multi-layer toner image transferred on the transfer belt 2 is brought to the secondary transfer unit comprising the bias roller 3 by rotation of the transfer belt 2. The secondary transfer unit comprises the bias roller 3 disposed at the surface side carrying the toner image of the transfer belt 2, backup roller 22 disposed to face the bias roller 3 from the back side of the transfer belt 2, and electrode roller 26 rotating in tight contact with the backup roller 22.

The paper 41 is taken out one by one from the paper block accommodated in the paper tray 4 by means of the pickup roller 42, and is fed into the space between the transfer belt 2 and bias roller 3 of the secondary transfer unit by means of the feed roller 43 at a specified timing. The fed paper 41 is conveyed under pressure between the bias roller 3 and backup roller 22, and the toner image carried on the transfer member 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31, made of polyurethane or the like, may be always in contact, and toner particles, paper dust, and other foreign matter sticking by transfer are removed.

In the case of transfer of a monochromatic image, the toner image T after primary transfer is immediately sent to the secondary transfer process, and is conveyed to the fixing device. But in the case of transfer of a multi-color image by combination of plural colors, the rotation of the intermediate transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and intermediate transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a drelt (a cross between and drum and a belt), a belt including an endless belt, an endless seamed flexible belt, an endless seamless flexible imaging belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, combinations of those transfer means, and the like.

As shown in FIG. 1, intermediate transfer member 2, in this embodiment a belt, is suspended on rollers (suspension rollers) 21, 22, 23 and 24 in an electrophotographic apparatus, and is driven in a tensed state for a long period of time. For this reason, the intermediate transfer belt is required to have sufficient strength and durability. Mechanical properties of special interest for intermediate transfer members are: Young's modulus (E), and flexural strength. YM(E), describes tensile elasticity; flexural strength, describes the ability of the film to resist bending. When an intermediate transfer member has a low YM(E), the belt is more prone to distortion, which will affect belt integrity and ultimately belt life. Belt distortion also negatively affects image registration. Low flexural strength, on the other hand, can cause belt rupture or fracture. In order to prevent scratches due to toner carrier, many intermediate transfer belts utilize a multi-layer structure comprising a substrate made from a resin composition containing a crystalline thermoplastic resin, and a high-hardness layer formed on the surface. However, when an intermediate transfer member has such a high-hardness layer formed thereon, the high-hardness layer needs to be a thin enough film so as to not deteriorate the flexural strength of the multi-layered member. These added parameter restrictions add a higher level of complexity and time to thin film preparation.

Figure 2:
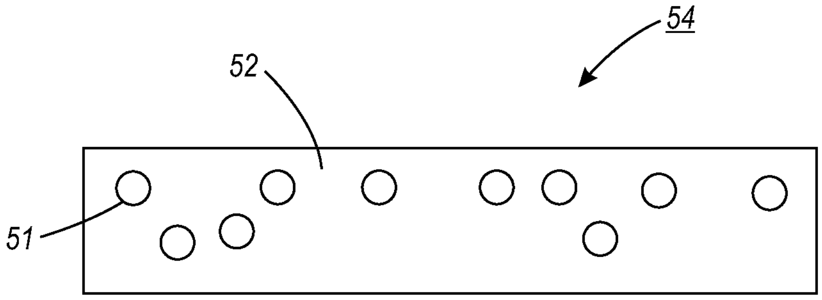
FIG. 2 is a schematic representation of an embodiment disclosed herein.

In an embodiment shown in FIG. 2, the intermediate transfer member 54 is in the form of a film in a one layer configuration. An intermediate transfer member 54 includes a single layer of a phenoxy resin 52. The single layer further contains conductive filler particles 51. The single layer can contain other polymers and fillers.

Figure 3:
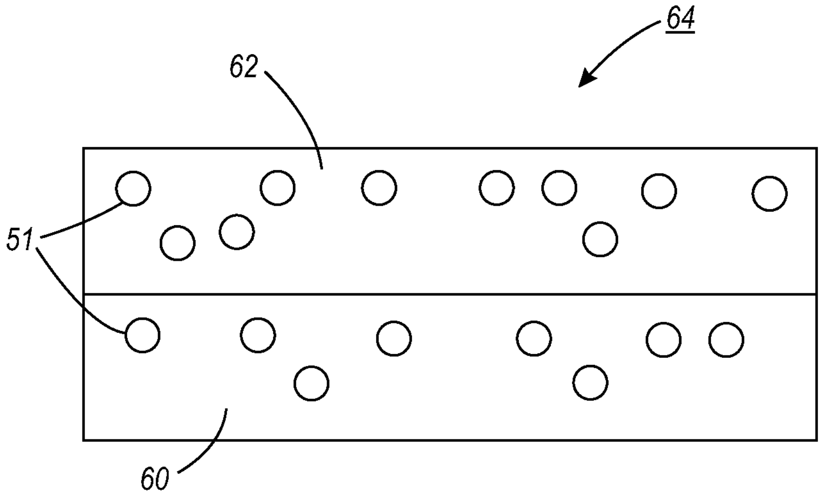
FIG. 3 is a schematic representation of an embodiment disclosed herein.

In an embodiment shown in FIG. 3, the intermediate transfer member 64 is in the form of a film in a two layer configuration. An intermediate transfer member 64 includes a substrate layer 60. An outer layer of phenoxy resin 62 is positioned on the substrate layer 60. Both the substrate layer and outer layer are shown containing conductive filler particles 51. Both the substrate layer and the outer layer can contain other polymers and fillers. The substrate layer 60 can be made from a number of different materials, including polyesters, polyurethanes, polyimides, fluorinated polyimides, polyolefins (such as polyethylene and polypropylene, polyethylene-co-polytetrafluoroethylene), polyamides (including polyamideimides), polyetherimides, polyphenylene sulfides, polysulfones, polycarbonates, PVDF or acrylics, or blends or alloys of such materials.

The single layer intermediate transfer member shown in FIG. 2 for electrophotographic imaging applications uses a phenoxy resin, with a conductive carbon black. The carbon black achieves the required conductivity. However, other conductive additives listed below can be used. The multi-layer intermediate transfer member shown in FIG. 3 uses a phenoxy resin with a conductive carbon black in the outermost layer. However, other conductive additives listed below can be used. Phenoxy resins are tough and ductile thermoplastic materials having a high cohesive strength and good impact resistance. This enables the phenoxy resin intermediate transfer member to have excellent mechanical properties. A single layer or multi-layer intermediate transfer member of phenoxy resin exhibits a Young's Modulus of from about 2,000 MPa to about 8,000 MPa, or from about 3,000 MPa to about 6,000 MPa or from about 4,000 MPa to about 5,000 MPa. The surface resistivity of the intermediate transfer member is easily tuned to proper resitivity. In addition, the cost of phenoxy resin is extremely low. The single layer intermediate transfer member of phenoxy resin provides a high performance intermediate transfer member at a low cost. The thickness of the single layer intermediate transfer member is from about 30 microns to about 400 microns, or from about 50 microns to about 200 microns, or from about 70 microns to about 150 microns.

The multi-layer intermediate transfer member of phenoxy resin also provides a high performance intermediate transfer member at a low cost. The thickness of the outer layer 62 is from about 1 micron to about 150 microns, or from about 10 microns to about 100 microns.

The electrically conductive particles 51 dispersed in the single layer 52 or the outer layer 62 decrease the resistivity into the desired surface resistivity range of from about $10^8$ ohms/square, to about $10^{13}$ ohms/square, or from about $10^9$ ohms/square, to about $10^{12}$ ohms/square. The volume resistivity is from about $10^7$ ohm-cm to about $10^{12}$ ohm-cm, or from about $10^8$ ohm-cm to about $10^{11}$ ohm-cm. The resistivity can be provided by varying the concentration of the conductive particles 51. The electrically conductive particles 51 may be present in an amount of from about 0.1 weight percent to about 50 weight percent, or from about 5 weight percent to about 40 weight percent, or from about 10 weight percent to about 30 weight percent of total solids of the intermediate transfer member. Typical intermediate transfer members containing conductive particles such as carbon black have a water contact angle of greater that about 70°, or greater than about 80°, or greater than about 85°.

Phenoxy resins are tough and ductile thermoplastic materials having high cohesive strength and good impact resistance. The backbone ether linkages and pendant hydroxyl groups promote wetting and bonding to polar substrates and fillers such as carbon black. Structurally, phenoxy resin is a polyhydroxyether having terminal alpha-glycol groups.

21CFR175.300 for direct and indirect food/beverage container coatings, as well as other paragraphs pertinent to adhesives used in multilayer packaging and plastic components for containers, which proves that phenoxy resin is a very friendly material.

In an embodiment, the phenoxy resin includes hydrophobic isocyanate chemical grafted onto the phenoxy resin. The structure is represented by:

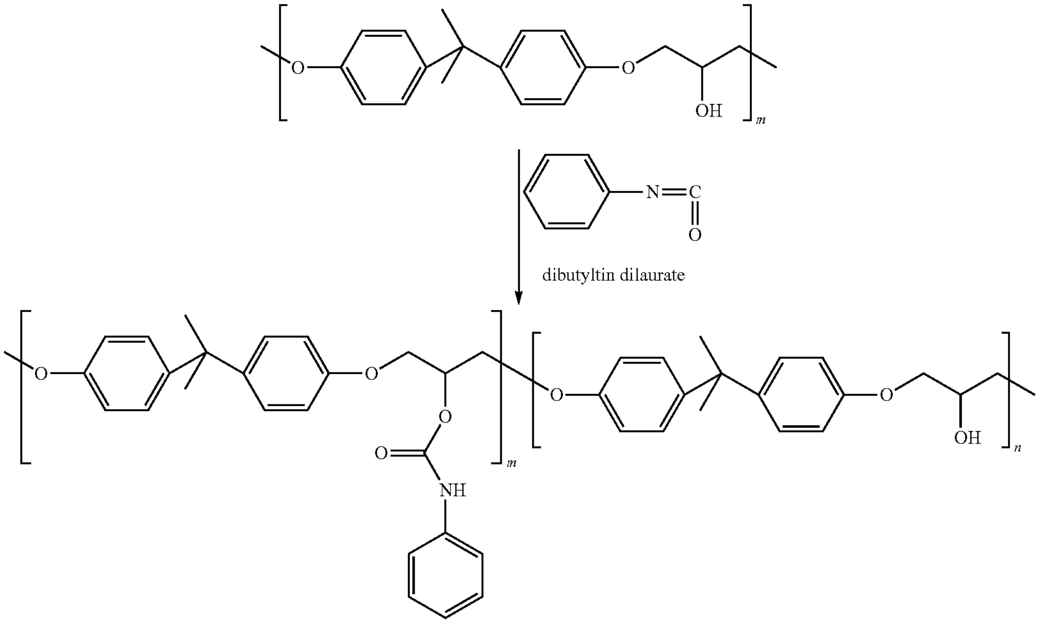

Shown below is the structure of phenoxy resin

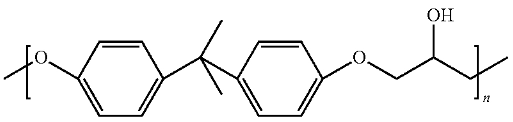

wherein n is from about 40 to about 400 or from about 70 to about 400 or from about 100 to about 350. The phenoxy resin is manufactured from polymers of bisphenol A and epichlorohydrin, polymers of bisphenol Z and epichlorohydrin, polymers of bisphenol AF and epichlorohydrin, polymers of bisphenol C and epichlorohydrin and polymers of bisphenol BP and epichlorohydrin.

Commercial phenoxy resins are available from InChem. Corp., Rock Hill, S.C. including PKFE ($M_n$=16,000 and $M_w$=60,000), PKHB ($M_n$=9,500 and $M_w$=32,000), PKHC ($M_n$=11,000 and $M_w$=43,000), PKHH ($M_n$=13,000 and $M_w$=52,000), PKHJ ($M_n$=16,000 and $M_w$=57,000), and PKHP ($M_n$=13,000 and $M_w$=52,000).

Polydispersity of phenoxy resin is very narrow, typically less than 4.0. An average molecule contains forty or more regularly spaced hydroxyl groups suitable for crosslinking for thermoset applications. These pendant hydroxyls are excellent sites for crosslinking in thermoset applications at elevated temperatures and even at ambient conditions.

Phenoxy has excellent vapor barrier properties (water vapor, oxygen, carbon dioxide) and is compliant with wherein m is from about 1 to about 399 and n is from about 399 to about 1. dibutylin dilaurate is the catalyst. In addition to phenyl isocyanate grafted onto the phenoxy resin, using polyisocyanate and grafting that onto the phenoxy resin a crosslinked phenoxy resin can be obtained.

Examples of isocyanate that can be used to react with the phenoxy resin include phenyl isocyanate, 1,1,3,3-tetramethylbutyl isocyanate, 1-adamantyl isocyanate, 1-naphthyl isocyanate, 2,2-diphenylethyl isocyanate, 2,3,4-trifluorophenyl isocyanate, 2,4,5-trimethylphenyl isocyanate, 2-benzylphenyl isocyanate, 4,4'-methylenebis(phenyl isocyanate), and the like. Commercial polyisocyanates from Bayer Corp. can also be included such as DESMODUR® N3200, N3300A, N75BA, CB72N, CB60N, CB601N, CB55N, BL4265SN, BL3475BA/SN, BL3370MPA, BL3272MPA, and BL3175A; MONDUR® M, CD, 582, 448, and 501.

Examples of conductive fillers used herein include carbon blacks such as carbon black, graphite, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof, Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixture thereof can be used as conductive fillers. The conductive filler may be present in an amount of from about 0.1 to about 50 and or from about 3 to about 40, or from about 5 to about 20 parts by weight of total solids of the intermediate transfer member. These ranges apply for either the single layer or multi-layer application.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher the surface area and the higher the structure, the more conductive is the carbon black. Surface area is measured by the B.E.T. nitrogen surface area per unit weight of carbon black, and is the measurement of the primary particle size. The surface area of the carbon black described herein is from about 460 $m^2/g$ to about 35 $m^2/g$. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); Channel carbon blacks available from Evonik-Degussa; Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

Further examples of conductive fillers include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC®ECP-S, M and T) and those antimony doped tin oxides without a core particle (e.g., ZELEC®ECP-3005-XC and ZELEC®ECP-3010-XC, ZELEC® is a trademark of DuPont Chemicals Jackson Laboratories, Deepwater, N.J.). The core particle may be mica, $TiO_2$ or acicular particles having a hollow or a solid core.

Examples of the metal oxide core include tin oxide, antimony-doped tin oxide, indium oxide, indium-doped tin oxide, zinc oxide, titanium oxide, etc. In an embodiment, the electrically conductive metal oxide core is antimony doped tin oxide. Suitable antimony doped tin oxide examples are T-1 from Mitsubishi Chemical, or ZELEC® ECP-3005-XC and ZELEC® ECP-3010-XC from of DuPont Chemicals.

In addition a shell layer can be attached to metal oxide core particles or metal oxide particles. A polyhedral oligomeric silsequioxane (POSS) funtionalized shell can be chemically grafted onto or attached to the metal oxide surface via a functional POSS such as a POSS silanol to provide a conductive particle for use in the intermediate transfer member using phenoxy resin.

In FIGS. 2 and 3, the phenoxy layer 52 and the outer phenoxy layer 62 can include a number of different materials, including polyesters, polyurethanes, polyimides, fluorinated polyimides, polyolefins (such as polyethylene and polypropylene, polyethylene-co-polytetrafluoroethylene), polyamides (including polyamideimides), polyetherimides, polyphenylene sulfides, polysulfones, polycarbonates, PVDF or acrylics, or blends or alloys of such materials.

A method of manufacturing the intermediate transfer member includes mixing conductive particles, phenoxy resin and a solvent to form a conductive particle mixture. The conductive particle mixture is coated on a substrate and dried. For a single layer intermediate transfer member, the dried coating is separated from the substrate.

Solvents useful for forming a solution of phenoxy resin and conductive particles include cyclohexanone, methyl ethyl ketone, benzyl alcohol, ethylenegylcol ethers, diethylenegylcol alkyl ethers, propylenegylcol alkyl ethers, phenoxypropanol, ethyl acetate, dibasic esters, tetrahydrofuran, N-methylpyrrolidone, diacetone alcohol, N,N'-dimethylformamide, N,N'-dimethylacetamide, methylene chloride and the like.

In an embodiment, a method of manufacturing an intermediate transfer member includes mixing carbon black particles, phenoxy resin and a solvent to form a carbon black mixture. The carbon black mixture is mixed with phenoxy resin and a solvent to form a coating dispersion. The dispersion is coated on a substrate and dried. The dried coating is separated from the substrate.

Typical techniques for coating such mixtures or dispersions on a substrate layer include flow coating, liquid spray coating, dip coating, wire wound rod coating, fluidized bed coating, powder coating, electrostatic spraying, sonic spraying, blade coating, molding, laminating, and the like.

Additives and additional fillers may be present in any of the above-described layers.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Carbon Black Dispersion I 5.0 grams of phenoxy resin PKFE was dissolved in 107 grams of cyclohexanone to form a solution. To this solution, 102.2 grams of carbon black (special Black 4 from Degussa) and 404 grams of cyclohexanone were added. The mixture was homogenized at 4000 rpm for 45 minutes.

Intermediate Transfer Member Coating Solution I:

2.0 grams of phenoxy resin PKFE, 8.0 grams of cyclohexanone, 0.42 grams Silclean 3700 solution, a polysiloxane copolymer from BYK, and 1.03 grams of carbon black dispersion I were mixed on a roll-mill for 30 minutes.

Coating for Intermediate Transfer Member:

Intermediate transfer member coating solution I was applied on Mylar film by a 10-mil Bird bar. The coating film was air-dried for 45 minutes, then further heated at 120° C. for 1 hour. The intermediate transfer member film thickness was about 60 microns. The surface resistivity of the intermediate transfer member is shown in Table 1.

TABLE 1

| Applied voltage, volt | 10 | 100 | 250 | 500 | 1000 |
|---|---|---|---|---|---|
| Surface Resistivity, Ω/sq | 5.99E+11 | 4.01E+11 | 2.65E+11 | 1.52E+11 | 7.06E+10 |

The intermediate transfer member had a Young's Modulus of about 4798 MPa, which is comparable to intermediate transfer members made of polyamide-imide or polyimides.

Example 2

Carbon Black Dispersion II 4.7 grams of phenoxy resin PKFE was dissolved in 50 grams of N,N-dimethylforamide. To this solution, 100.0 grams of carbon black (special Black 4 from Degussa) and 850 grams of DMF were added. The mixture was homogenized at 6400 rpm for 45 minutes.

Intermediate Transfer Member Coating Solution II:

200 grams of phenoxy resin PKFE, 270 grams of tetrahydrofuran, 270 grams of n-butyl acetate, 20.0 grams of Silclean 3700 solution, a polysiloxane copolymer from BYK, 90 grams of N-methylpyrrolidinone and 137.3 g of carbon black dispersion II were mixed on a roll-mill for 15 hours.

Coating for Intermediate Transfer Member:

Intermediate transfer member coating solution I was applied on Mylar film by a 10-mil Bird bar. The coating film was air-dried for 1 hour, and then further heated at 145° C. for 1.5 hours. The surface resistivity of the intermediate transfer member is shown in Table 2.

TABLE 2

| Applied voltage, volt | 10 | 100 | 250 | 500 | 1000 |
|---|---|---|---|---|---|
| Surface Resistivity, Ω/sq | 3.82E+11 | 2.06E+11 | 1.28E+11 | 8.25E+10 | 4.85E+10 |

The intermediate transfer film thickness averaged about 113 μm and the resulting Young's Modulus averaged about 3962 Mpa.

Example 3

Preparation of Isocyanate Grafted Phenoxy Resin

An isocyanate grafted phenoxy resin was prepared as follows; in a three-necked round-bottom 2-liter flask, equipped with inert gas inlet, water-cooling condenser and mechanical stirrer, 400 grams of phenoxy resin PKFE was dissolved in 800 grams of N,N'-dimethylformamide (DMF). To this solution, 33 grams of phenyl isocyanate was added dropwise, with agitation under nitrogen flowing. After finishing the addition of the isocyanate, dibutyltin dilaurate (1.0 g) was added as the catalyst. After the addition, the reaction mixture was stirred at room temperature for 45 minutes. Then, the reactor was heated to 85° C. for 4 hours. After the reactor was cooled down to room temperature, another portion of DMF was added to let the solution have solid content of about 20% by weight.

Carbon Black Dispersion III:

A carbon black master batch dispersion was prepared in a 2-liter cylindrical container. 105.48 grams of Special Black 4 (from Degaussa) in powder form was mixed with 10 grams of phenoxy resin PKFE in 728 grams of DMF. This mixture was homogenized at 4000 rpm for 1.5 hours. The collected mixture was very stable over several weeks.

Intermediate Transfer Member Coating Solution III:

The isocyanate phenoxy resin solution (10 g) was mixed with 1.6 g of the above carbon black dispersion III for 30 minutes. This mixed dispersion was coated on stainless steel substrate using a 10-mil Bird bar. The ITB coating was air-dried for 45 minutes, and then dried at 135° C. for 1 hour.

The resulting isocyanate phenoxy ITB coating released from the stainless steel substrate without difficulty when compared with the release of the unmodified phenoxy ITB coating. Some key properties were measured for the disclosed modified phenoxy ITB, and summarized in Table 3.

TABLE 3

| | Surface resistivity (log ohm/sq) | Young's modulus (MPa) |
|---|---|---|
| isocyanate phenoxy ITB | 9.9 | 3,500 |
| polyamide ITB | 13.0 | 1,100 |
| PVDF ITB | 9.8 | 1,000 |
| polyimide ITB | 11.2 | 3,400 |
| polyimide ITB from | 10.4 | 3,500 |

When compared with some thermoplastic ITB members on the market (polyamide or PVDF ITB), the disclosed modified phenoxy ITB member exhibited significantly higher modulus, which was even comparable to that of some polyimide ITB's.

By adjusting grafting density, part or all of the hydroxyl groups can be reacted. Furthermore, when a polyisocyanate is used instead of phenyl isocyanate as shown above, a polyisocyanate crosslinked phenoxy resin is formed. An isocyante grafted phenoxy ITB will exhibit less moisture sensitivity also due to the elimination of the polar hydroxyl groups.

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. An intermediate transfer member comprising:

a surface layer comprising a phenoxy resin having dispersed therein conductive particles, wherein the phenoxy resin has the structure

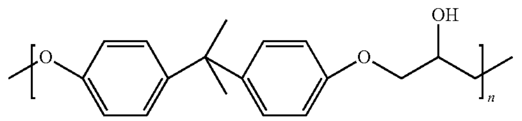

wherein n is from about 40 to about 400, and wherein the surface layer has a Young's Modulus of about 2,000 MPa to about 8,000 MPa.

2. The intermediate transfer member of claim 1 wherein the conductive particles are selected from the group consisting of carbon black, graphite, acetylene black, fluorinated carbon black, metal oxides, doped metal oxides polyaniline, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene and mixtures thereof.

3. The intermediate transfer member of claim 1 further comprising a polymer selected from the group consisting of polyesters, polyurethanes, polyimides, fluorinated polyimides, polyamideimides, polyolefins, polyamides, polyetherimides, polyphenylene sulfides, polysulfones, polycarbonates, PVDF and acrylics.

4. The intermediate transfer member of claim 1, wherein the surface layer has a water contact angle of greater than about 70°.

5. The intermediate transfer member of claim 1, wherein the surface layer comprises conductive particles in an amount of from about 0.1 weight percent to about 50 weight percent of total solids of the transfer member.

6. The intermediate transfer member of claim 1, wherein the surface layer has a surface resistivity of from about $10^8$ Ω/square to about $10^{13}$ Ω/square.

7. The intermediate transfer member of claim 1, wherein the surface layer has a thickness of from about 30 micron to about 400 microns.

8. The intermediate transfer member of claim 1, wherein isocyanate is grafted onto the phenoxy resin.

9. The intermediate transfer member of claim 1, further comprising a substrate, wherein said surface layer is positioned on said substrate.

10. The intermediate transfer member of claim 8 wherein the isocyanate is selected from the group consisting of phenyl isocyanate, 1,1,3,3-tetramethylbutyl isocyanate, 1-adamantyl isocyanate, 1-naphthyl isocyanate, 2,2-diphenylethyl isocyanate, 2,3,4-trifluorophenyl isocyanate, 2,4,5-trimethylphenyl isocyanate, 2-benzylphenyl isocyanate, 4,4'-methylenebis(phenyl isocyanate), and mixtures thereof.

11. The intermediate transfer member of claim 9 wherein the substrate comprises conductive particles selected from the group consisting of carbon black, graphite, acetylene black, fluorinated carbon black, metal oxides, doped metal oxides polyaniline, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixtures thereof.

12. An intermediate transfer member comprising:

a surface layer comprising a phenoxy resin having dispersed therein conductive carbon black particles wherein the phenoxy resin has the structure

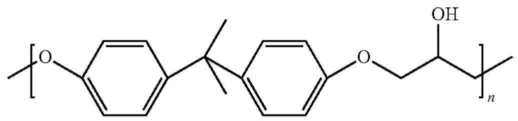

wherein n is from about 40 to about 400 wherein the surface layer has a Young's Modulus of about 2,000 MPa to about 8,000 MPa.

13. The intermediate transfer member of claim 12, wherein the surface layer has a thickness of from about 30 micron to about 400 microns.

14. The intermediate transfer member of claim 12, wherein the surface layer has a surface resistivity of from about $10^8$ Ω/square to about $10^{13}$ Ω/square.

15. The intermediate transfer member of claim 12, wherein the surface layer has a water contact angle of greater than about 70°.

16. The intermediate transfer member of claim 12, wherein the conductive carbon black particles are present in an amount of from about 0.1 weight percent to about 50 weight percent of total solids of the surface layer.

17. An intermediate transfer member comprising:

a surface layer comprising a phenoxy resin having dispersed therein conductive carbon black particle wherein the phenoxy resin has the structure:

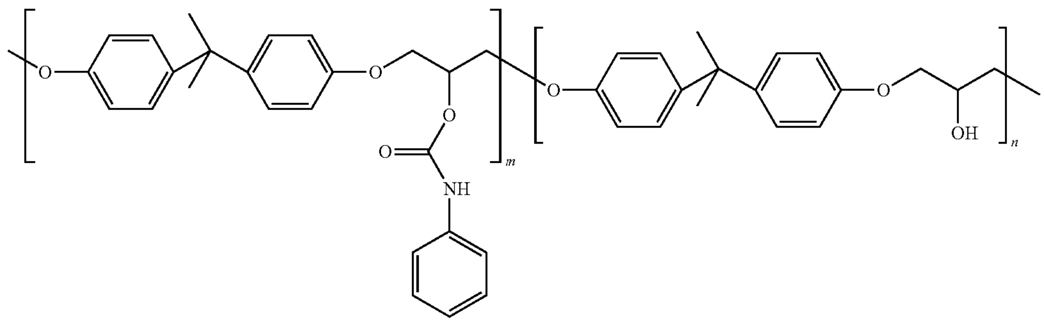

wherein m is from about 1 to about 399 and n is from about 399 to about 1.

18. The intermediate transfer member of claim 17, wherein the conductive carbon black particles comprise from about 0.1 weight percent to about 50 weight percent of total solids of the transfer member.

* * * * *